United States Patent [19]
Andre et al.

[11] Patent Number: 5,938,382
[45] Date of Patent: Aug. 17, 1999

[54] DEVICE FOR MANEUVERING A LOAD BEARING STRUCTURE USING A PAIR OF SCREWS, EACH WITH A TRANSFER SCREW

[75] Inventors: Jean-Luc Andre, Obernai; Martin Klotz, Lingolsheim, both of France

[73] Assignee: Lohr Industrie, Hangenbieten, France

[21] Appl. No.: 08/867,904

[22] Filed: Jun. 3, 1997

[30] Foreign Application Priority Data

Jun. 7, 1996 [FR] France ................................. 96 07253

[51] Int. Cl.⁶ ......................................................... B60P 9/00
[52] U.S. Cl. ............................ 410/24; 410/4; 410/29.1; 187/214; 187/267
[58] Field of Search .................................. 410/4, 24, 26, 410/29.1; 187/214, 267, 268, 282, 284, 302, 305, 413; 414/495

[56] References Cited

U.S. PATENT DOCUMENTS

| 1,181,909 | 5/1916 | McFadden | 410/24 |
|---|---|---|---|
| 1,892,589 | 12/1932 | Snyder | 410/24 |
| 4,267,901 | 5/1981 | Tsujimura | 187/214 X |
| 4,822,222 | 4/1989 | Zeuner et al. | 410/29.1 |
| 5,067,862 | 11/1991 | Andre | 410/26 |
| 5,595,465 | 1/1997 | Knott | 410/24 |
| 5,702,222 | 12/1997 | Rosen | 187/214 X |

FOREIGN PATENT DOCUMENTS

| 0 001 364 | 4/1979 | European Pat. Off. . | |
|---|---|---|---|
| 0 518 795 | 12/1992 | European Pat. Off. . | |
| 2 181 246 | 11/1973 | France . | |
| 1134334 | 8/1962 | Germany | 410/4 |
| 31 47 591 | 6/1983 | Germany . | |
| 90 05 043 | 7/1990 | Germany . | |
| 39 20 323 | 1/1991 | Germany . | |
| 927 361 | 5/1963 | United Kingdom . | |

Primary Examiner—Stephen T. Gordon
Attorney, Agent, or Firm—Davis and Bujold

[57] ABSTRACT

The maneuvering device comprises two hydraulic motors (14, 15), each attached to the base of each screw (4, 5) integrated into each post (2, 3) of a pair of posts. The hydraulic motors (14, 15) are supplied in series by a single course of pressurized fluid and each shunted through a bypass comprising a hydraulic shunt which opens either automatically or is regulated to open completely, partially or progressively. This invention is of particular interest to auto body manufacturers for use on road trailers for carrying vehicles.

17 Claims, 3 Drawing Sheets

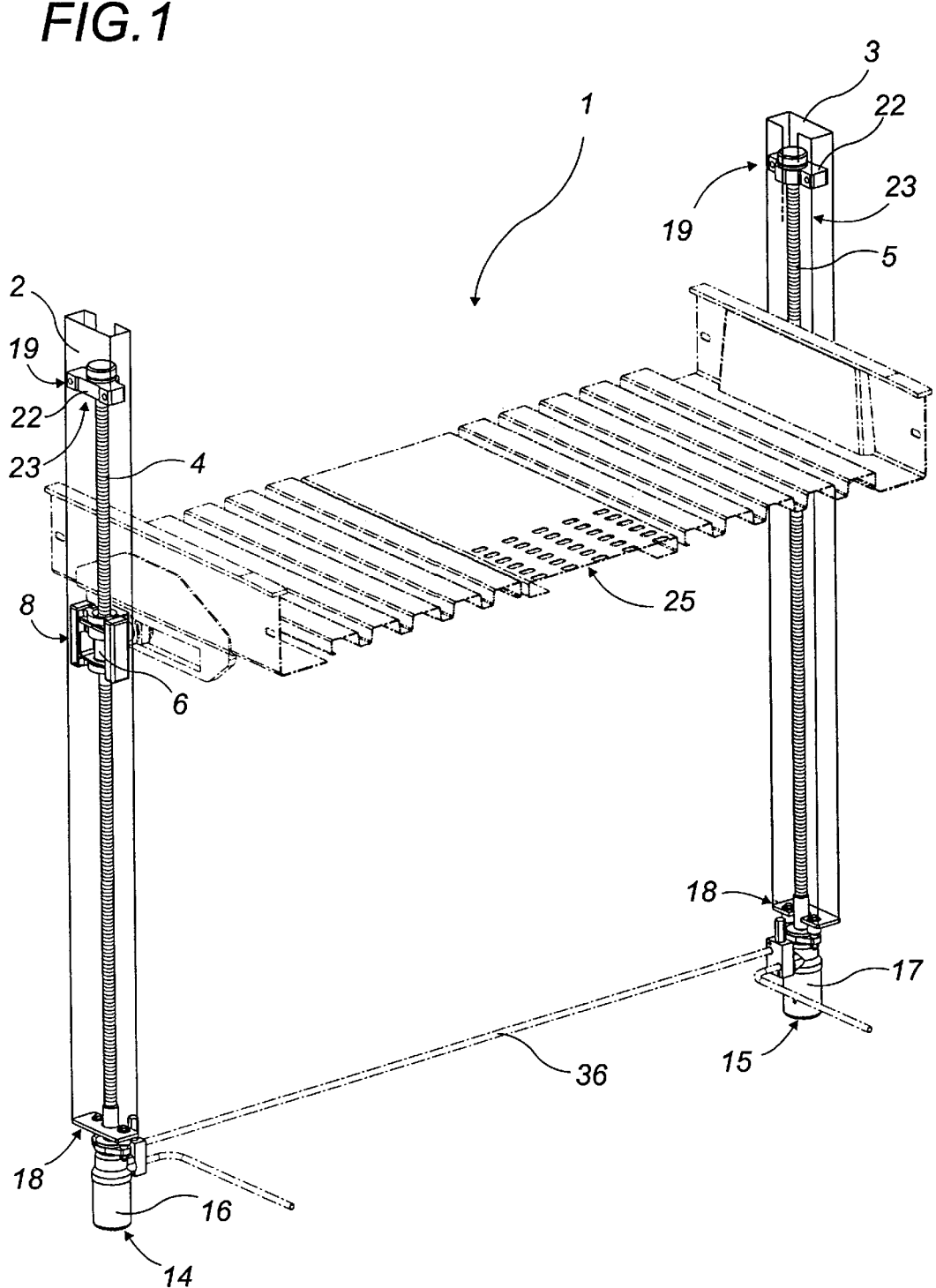

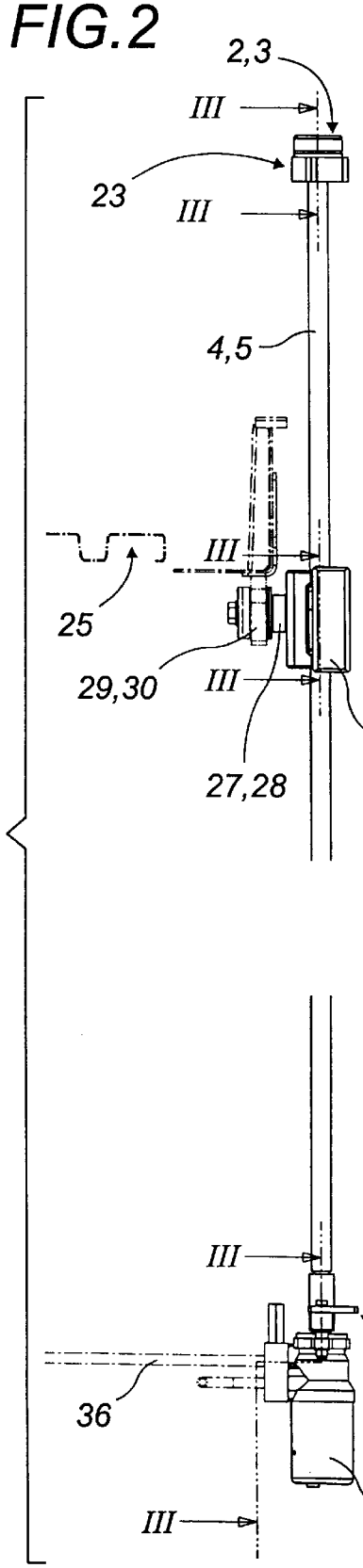
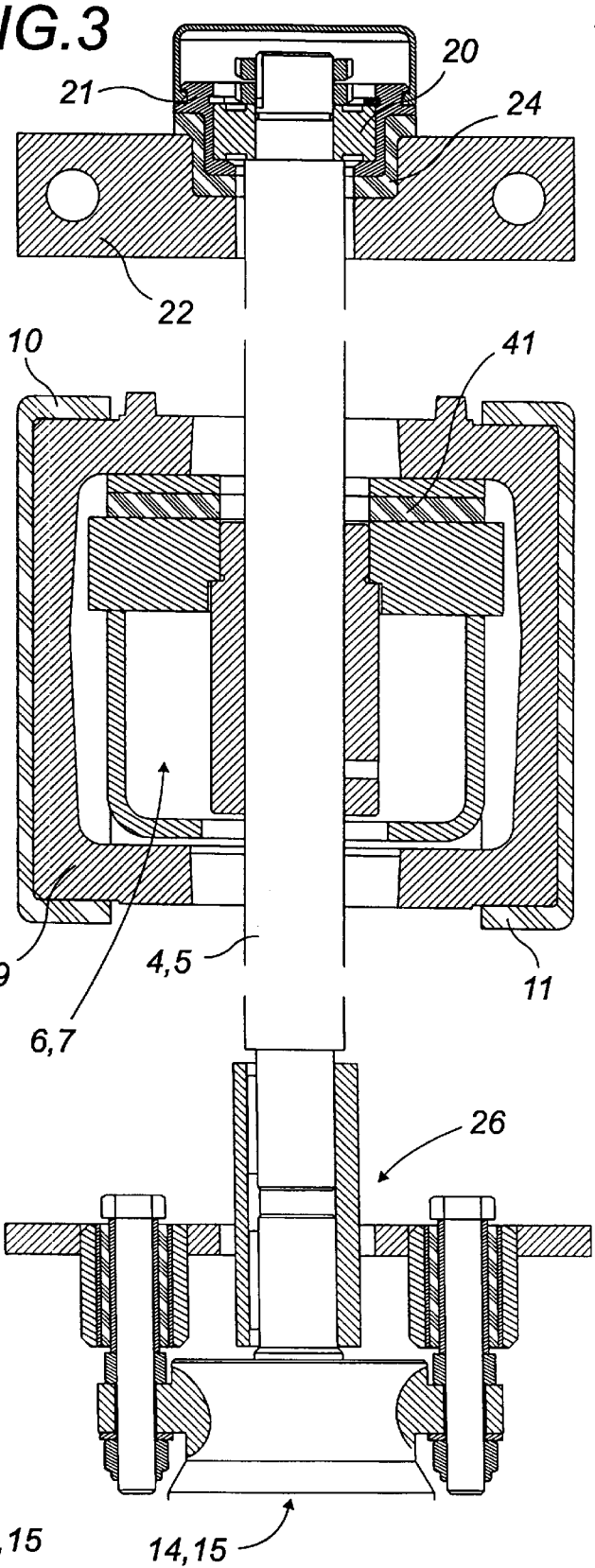

DEVICE FOR MANEUVERING A LOAD BEARING STRUCTURE USING A PAIR OF SCREWS, EACH WITH A TRANSFER SCREW

The present invention relates to a maneuvering device for either raising and lowering or pushing and pulling a load bearing structure, specifically a road trailer for carrying vehicles.

The screws used to raise the pairs of posts used in transporting vehicles loaded on platforms or plates held by these screws are conventionally controlled by one or more motors using mechanical, electrical, or hydraulic energy, positioned either between the posts or at the base of the post in each pair.

Some examples of such devices are described in French Patent Nos. 2,403,234 and 2,432,403 in the name of Société LOHR.

In these patents, the screws on the support posts, preferably four in number, are activated either by using a single motor for all four posts or one motor associated with each pair.

When there is a single motor for all four screws, the transmission system is extensive and complex, since it must transmit movement to four screws which are quite far apart from one another.

Using one motor associated with each pair of posts allows independent movement between the pairs of posts and permits the platform or plate supported by the four posts to be inclined.

While the simplified concept of using one hydraulic motor for each pair of posts is appealing, it means that at least one transverse kinematic connection with a return angle must be used to transmit activating movement to the base of the counterpart post or posts.

In addition to being mechanically complex, this type of drive means is expensive and has other disadvantages of varying importance as well.

The first of these is that the transverse kinematic connection is not efficient, particularly the connection with the return angle or angles.

Moreover, extra work is required on the trailer body to install the transverse connection of this lifting system.

Additionally, the bulk of this system makes the area beneath and between the posts unavailable for use.

Finally, the mechanical drive means is quite noisy, which causes problems raising and lowering the platforms, particularly at night.

The goal of the present invention is to eliminate these various disadvantages.

To accomplish this, the invention provides a smaller device which is quiet, does not vibrate, has a higher mechanical efficiency, and is more reliable than prior art devices, all at a lower cost than prior art devices.

The invention relates to a maneuvering device for either raising and lowering or pushing and pulling a load bearing structure, specifically a road trailer for carrying vehicles, formed of a pair of screws, each with a transfer screw enclosed within a fork which is displaced along each post in the pair of posts, characterized in that the screws each have an upper stop and a lower stop and a reference position detector or indicator, and further in that the screws each comprise a hydraulic motor at one end, said motors being supplied in series by the same pressure source and each bypassed by a diverter, with each diverter having a hydraulic shunt which opens either automatically or using controls and allows hydraulic fluid to flow through if the corresponding hydraulic motor stops or is blocked.

The advantages consist of the presence of two hydraulic motors, one at the base of each screw, the system supplies the motors in series, and the use of a shunt in each motor supply circuit which either opens automatically or which can be regulated.

Other advantages include the size of the device, the accessibility of the lower area between the posts, and the economical price of the unit, as well as reduced installation and construction costs.

Other features and advantages of the invention will be apparent from the following description, given by way of example, and from the accompanying drawings, wherein:

FIG. 1 is a schematic view showing the ensemble of the lifting unit with screws and posts, driven from the base by hydraulic motors;

FIG. 2 is a simplified surface view showing the positions of the longitudinal cross-sections along lines III—III;

FIG. 3 is a view showing a cross-section of a post taken along lines III—III of FIG. 2;

Figure 4:
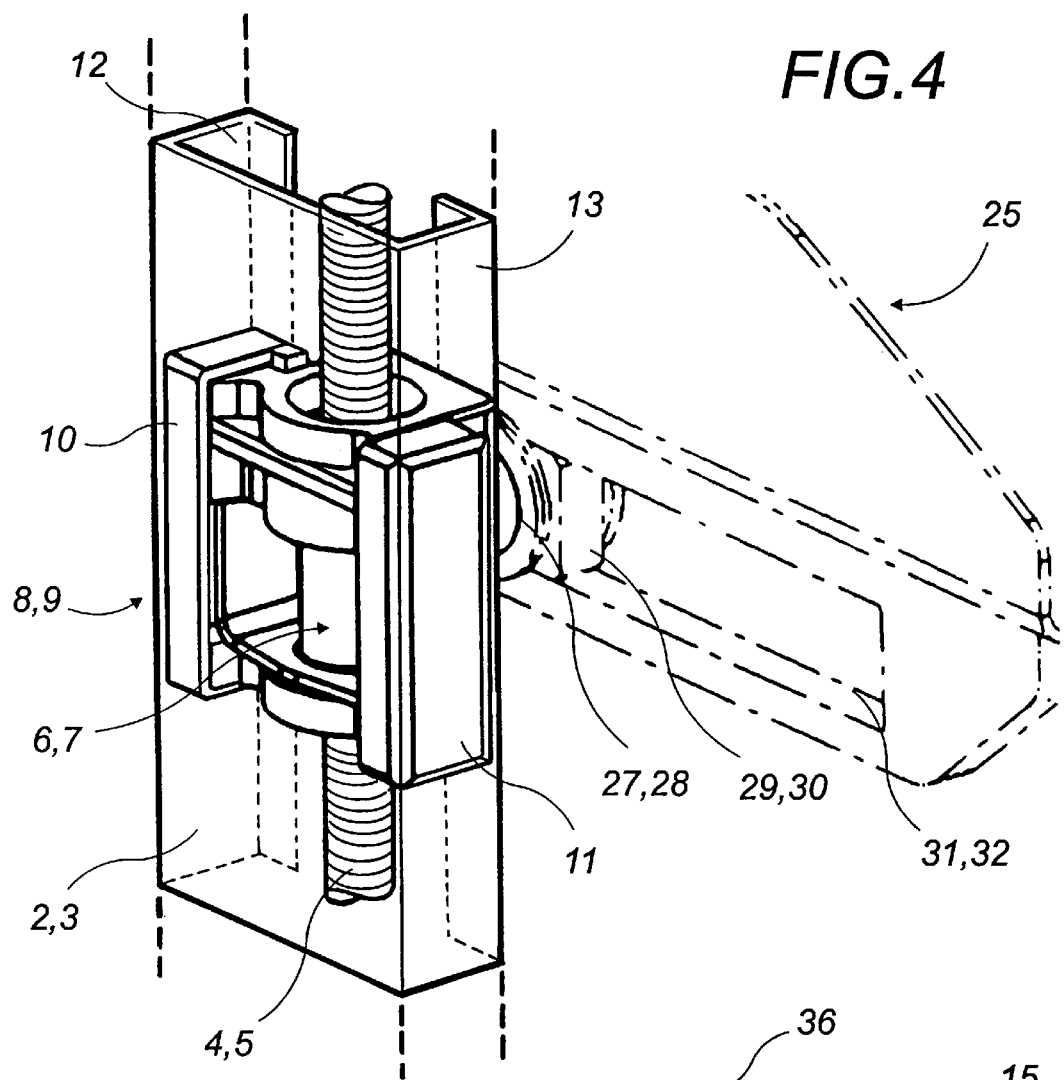
FIG. 4 is an enlarged perspective of a fork with its transfer screw.
Figure 5:
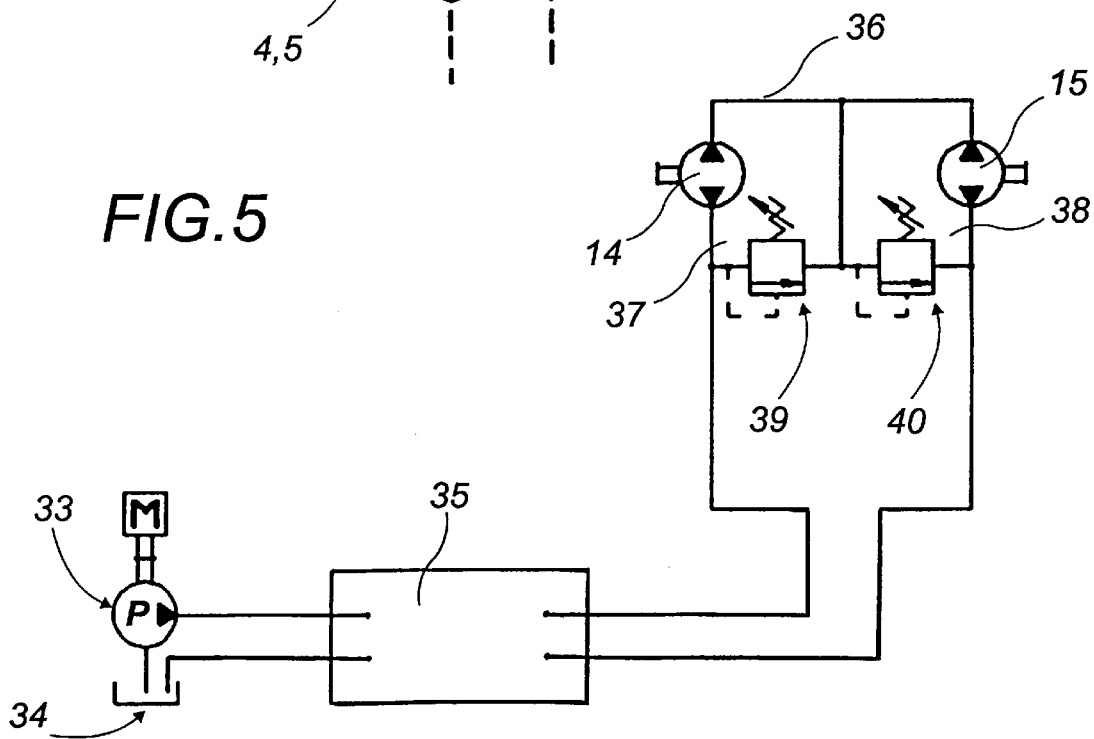
FIG. 5 is a schematic drawing of the hydraulic system supplying the motors.

With reference to FIG. 1, the invention consists of a pair 1 of two vertical lifting posts 2,3, either inclined or horizontal, each supporting and enclosing a motorized screw 4, 5, which is preferably suspended, with a transfer screw 6, 7 attached to each one and connected to a fork 8, 9 which serves as a housing.

Forks 8, 9 preferably each comprise two lateral runners 10, 11 for displacing them along the posts, which have longitudinal interior edges such as 12, 13 serving as guides.

Each screw on each post is driven in rotation by a hydraulic motor 14, 15 with an engine block 16, 17 provided at one of the upper extremities 18 or lower extremities 19 of the screws, in the linear extension of the screw.

Screws 4, 5 are fastened in the posts at one end by means of a thrust block 20, which may have ball bearings. Thrust block 20, or motor 14, 15 when in the upper position, is attached to flexible blocks such as block 21, connected to a support piece 22 serving as an upper block 23, with a flexible intermediate layer 24.

Each fork 8, 9 constitutes the interface between each transfer screw and some connecting structure, preferably a load bearing structure such as the one denoted by reference numeral 25 in FIG. 1, which may consist of a plate, a platform, or some other shorter shape supporting a load, and which is carried by a road trailer transporting vehicles.

Screws 4, 5 are attached in such a way that they are suspended with omnidirectional elastic shock absorbers at one end and guided with some axial play at the other end, for example, with one extremity formed into a fluted shaft attached to a fluted connecting sleeve 26 which engages a drive element of the hydraulic motor.

The term "post" will subsequently be used to designate the metallic structure or structures which support the screws by at least one extremity and enclose them. The term will be used throughout the description without limitation to denote the vertical screws as well as the horizontal or inclined screws. Thus, the term will not imply any particular reference to the relative inclination or position of the screws.

Among the various possible applications is the possibility of displacing either directly or by using some intermediate means a load bearing structure which is either inclined or balanced on a crossbar, such as a loading ramp or the like. In this application the posts are either horizontal or slightly inclined.

The load bearing structure is maintained and can be inclined using connectors such as pivot axles 27, 28 projecting from forks 8, 9 which may have a pulley or a runner 29, 30, and using other adaptations along load bearing structure 25.

In the case of several pairs of posts, it is certainly possible to use additional known means for simultaneously moving the load bearing structure translationally while inclined, or simply inclining it, for example, rolling or sliding along the courses on the sides of the structure shown in the drawings as 31, 32, where the pulleys of pivot axles 27, 28 can slide or roll.

Each motorized lifting screw 4, 5 is driven directly by a hydraulic motor 14, 15 whose engine blocks 16, 17 are housed in the upper or lower portions of the posts in alignment with the lifting screws.

Hydraulic motors 14, 15 are supplied with pressurized hydraulic fluid from the same source 33, which may be a pump driven by a motor M, a power take-off-driven device, or some other means for generating pressurized fluid, through a single device controlling the distributor circuit inlet or another device common to both motors.

Motors 14, 15 are supplied with hydraulic fluid in series, that is, by a connecting loop, through a single conduit from a pressure source 33 with a return to a tank 34 through a general control means, for example, a distributor 35. Thus, the two motors are connected using a simple supply conduit 36. According to the invention, this is the only connection that exists between the two motors.

Thus, the space between the two poles which is occupied by the mechanical connections in prior art devices becomes available for other uses.

Motors 14, 15 are each shunted by a hydraulic bypass 37, 38 comprising a hydraulic deviation device 39, 40 which may open either automatically, using a pressure limiter, or which may open either completely, partially, or progressively by means of an exterior control such as an electrovalve or some similar hydraulic component. There may be a release to control opening which operates by physically detecting a reference position marked by an indicator. It can also be controlled by continuously comparing the size of the instant position with a variable physical size reaching an assigned value which represents the reference position. Also, any other similar means can be used, such as one or more retractable mechanical stops, either fixed or displaceable, an induction detector, a contact detector, a micro circuit breaker, or other means of detection or approach, for example, an object sensor or an indicator detecting displacement of the fork or the screw, an electrical, electronic or computerized index or a detector providing calculations used to control the total, partial or progressive opening of hydraulic shunt component 39, 40.

Hydraulic shunt components 39, 40 may consist of pressure limiters such as anti-return valves or other similar components which will automatically open the device under certain pressure/flow conditions.

It is also possible to use other hydraulic deviation components such valves, electrovalves and the like which are remotely controlled to open the device either partially, progressively, or proportionately.

Screw 6, 7 is maintained so that it floats with some functional play inside fork 8, 9 which serves as its housing in the following manner.

The upper and/or the lower surface of each screw is in contact with the upper portion of the fork housing, which is traversed by the screw with a piece of elastomeric material 41. An internal housing may be used to mechanically maintain the flexible connection of the fork and the housing.

Flexible connecting or contact element 41 prevents the screw from wedging or becoming suddenly blocked in the housing and eliminates wear and tear by maintaining the screw in position. Jerking and vibrations are reduced or even eliminated.

As shown in FIG. 3, the screw is suspended by its upper extremity in the support piece 22 which serves as an upper stop, using a flexible block 21 which allows a certain degree of axial play.

The end of each screw 4, 5 is driven directly by its hydraulic motor 14, 15, which is attached in the extension. To provide the desired amount of play, this extremity is a fluted axle which uses a fluted connecting sleeve 26 to engage a complementary drive element which constitutes the mechanical outlet of the hydraulic motor.

The mechanical drive coupling may also consist of a homokinetic gasket.

Because the two hydraulic motors 14, 15 are connected in series, they are able to raise transfer screws 6, 7 synchronously.

Since disparities in performance eventually arise due to internal motor leaks, it is not possible to guaranty that forks 8, 9 are displaced in perfect synchrony.

After numerous maneuvers, these disparities may cause the positions of the left and right forks to become unbalanced, as a result of which the load bearing structure may slope. It is possible to compensate for the disparities by using a zero reset circuit with at least one stop along the course or at the end of the course, or at least one reference position for each fork causing the motor corresponding to the front fork to either be blocked, stopped, or slowed down; that is, in the case of blocking, the fork which first makes contact with the stop would define the reference position.

The motor is stopped by a detector which opens the hydraulic shunt either totally, partially, or progressively as it approaches the reference position or at the moment it reaches the reference position. The other motor continues to drive the corresponding screw until it reaches the same position as the opposite fork.

The reference positions may consist of intermediate stops in the form of a fixed or displaceable piece, which is always retractable. The reference position function may also be fulfilled by a position detector, a proximity detector, or a motion detector, or by comparison with an assigned value.

Thus, the piece forming the stop may be replaced by a detector placed along the path of transfer screw 6, 7 or fork 8, 9 which would incorporate a detectable element. Or the opposite may be true, with the detector placed within the transfer screw or within the fork.

In general, there is either a physical indicator or an indication furnished by variation in values provided by a sensor. For example, the number of times the screw turns furnishes data about the position of the transfer screw. This data could be used to control the opening of the shunt when the screw has turned enough times to reach the stop position.

A device using a physical position stop functions in such a way that the screw which first makes contact with the reference position stop blocks the corresponding motor. Because of the bypass on the motor terminals, the high internal resistance of the motor forces the pressure limiter to open, activating the shunt. Opening the pressure limiter therefore supplies the other motor directly through the shunt and the connecting conduit between the motors, since they are connected in series, and the other motor, continuing to turn, positions the fork at the reference stop.

In the case where there is a reference position consisting of something other than physical stops, the motor cannot be blocked and will be stopped.

If there is an abnormal slant, the driver will readjust the horizontal position of the plate by placing the load bearing structure in the reference position. He will then place it in the position desired for the purpose at hand. For example, he may allow it to reach the stop at the upper end of the course, where the transverse horizontal position will correct itself automatically in the embodiment using a pressure limiter.

According to the invention, it is also possible to continuously synchronize both forks 8, 9 by permanently controlling the relative positions of the forks using a position indicator, for example, a revolution counter, and using a calculator or a comparator with that information to control the opening of the hydraulic deviation device.

Another way to control and continuously correct synchronization is to slow down the motor that is ahead of its counterpart. This is done by using a variable control opening valve on the deviation branch, for example, a proportionate electrovalve.

What we claim is:

1. A maneuvering device for one of raising, lowering, pushing and pulling a load bearing structure, said maneuvering device comprising a pair of spaced apart posts, and each of said spaced apart posts comprising;
    a displaceable fork;
    a transfer screw being supported by said fork;
    a rotatable screw being threadingly engaged with said transfer screw to facilitate movement of said transfer screw and said fork along said post;
    a hydraulic motor being connected adjacent one end of said rotatable screw for providing rotational drive to said rotatable screw for displacing said transfer screw and said fork along said post;
    a load bearing structure interconnecting said forks with one another;
    each of said hydraulic motors being coupled in series to a single pressure source, at least one of said hydraulic motors having a hydraulic shunt with a hydraulic bypass which, when opened, one of automatically or by operation of an extraneous control, allows at least a portion of supplied hydraulic fluid to pass through said hydraulic shunt and thereby bypass said hydraulic motor to thus alter the rotational drive being provided by said hydraulic motor to said rotatable screw;
    each of said rotatable screws having at least one reference position; and
    a comparator for measuring an instantaneous displacement value for each transfer screw relative to said reference position, the displacement values of each transfer screw being compared in order to determine any lag between said transfer screws and, when a lag is determined by said comparator, the transfer screw determined to be ahead of the lagging transfer screw is controlled, by short circuiting fluid supplied to the associated hydraulic motor through said hydraulic shunt associated with the transfer screw which is determined to be ahead, at least until the lag between said pair of transfer screws is eliminated.

2. The maneuvering device according to claim 1 wherein each said transfer screw has an upper stop and a lower stop which define displacement limits of said fork; and
    said reference position of each said rotatable screw is at least one of said upper stop and said lower stop.

3. The maneuvering device according to claim 2 wherein said reference position is an intermediate position between said upper stop and said lower stop.

4. The maneuvering device according to claim 2 wherein said hydraulic shunt is opened when said fork reaches one of said upper stop and said lower stop.

5. The maneuvering device according to claim 1 wherein the automatic opening device is a pressure limit device.

6. The maneuvering device according to claim 5 wherein said pressure limit device is an anti-return valve.

7. The maneuvering device according to claim 1 wherein said hydraulic shunt is opened when a reference position detector detects passage of said fork.

8. The maneuvering device according to claim 1 wherein said rotatable screws extend substantially horizontally but are slightly inclined.

9. The maneuvering device according to claim 1 wherein said reference position is defined by an indicator.

10. The maneuvering device according to claim 9 wherein said reference position is defined by a number of times said rotatable screw rotates.

11. The maneuvering device according to claim 1 wherein a detectable element is provided on said transfer screw and said reference position is a detector for sensing movement of said detectable element.

12. The maneuvering device according to claim 1 wherein a detectable element is provided on said fork and said reference position is a detector for sensing movement of said detectable element.

13. The maneuvering device according to claim 12 wherein said detectable element is a proximity detector.

14. A maneuvering device for one of raising, lowering, pushing and pulling a load bearing structure, said maneuvering device comprising a pair of spaced apart posts, and each of said spaced apart posts comprising;
    a displaceable fork;
    a transfer screw being supported by said fork;
    a rotatable screw being threadingly engaged with said transfer screw to facilitate movement of said transfer screw and said fork along said post;
    a hydraulic motor being connected adjacent one end of said rotatable screw for providing rotational drive to said rotatable screw for displacing said transfer screw and said fork along said post;
    a load bearing structure interconnecting said forks with one another;
    wherein one of said hydraulic motors rotates at a faster speed than the other hydraulic motor and relative alignment of said forks is continuously controlled by slowing the rotational speed of said faster hydraulic motor.

15. The maneuvering device according to claim 14 wherein said faster hydraulic motor is slowed down by varying a degree of opening of a said hydraulic shunt.

16. The maneuvering device according to claim 15 wherein said the opening of the hydraulic bypass being provided by a valve.

17. A maneuvering device for one of raising, lowering, pushing and pulling a load bearing structure, said maneuvering device comprising a pair of spaced apart posts, and each of said spaced apart posts comprising;
    a displaceable fork;
    a transfer screw being supported by said fork;
    a rotatable screw being threadingly engaged with said transfer screw to facilitate movement of said transfer screw and said fork along said post;
    a hydraulic motor being connected adjacent one end of said rotatable screw for providing rotational drive to said rotatable screw for displacing said transfer screw and said fork along said post;
    a load bearing structure interconnecting said forks with one another;
    wherein each one of said transfer screws is attached to the respective fork via a flexible connector.

* * * * *